(12) United States Patent
Sander

(10) Patent No.: US 8,174,247 B2
(45) Date of Patent: May 8, 2012

(54) MICROWAVE TRANSMISSION LINE DC/DC CONVERTER

(75) Inventor: Sverker Sander, Billdal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 453 days.

(21) Appl. No.: 12/446,715

(22) PCT Filed: Oct. 24, 2006

(86) PCT No.: PCT/SE2006/001205
§ 371 (c)(1),
(2), (4) Date: Apr. 22, 2009

(87) PCT Pub. No.: WO2008/051119
PCT Pub. Date: May 2, 2008

(65) Prior Publication Data
US 2010/0033157 A1   Feb. 11, 2010

(51) Int. Cl.
*G05F 1/613* (2006.01)
*G05F 1/40* (2006.01)

(52) U.S. Cl. .................................... 323/225; 323/271

(58) Field of Classification Search .......... 323/222–225, 323/268, 271
See application file for complete search history.

(56) References Cited

U.S. PATENT DOCUMENTS

| | | | | |
|---|---|---|---|---|
| 3,832,647 A | * | 8/1974 | Beurrier | 330/286 |
| 5,729,562 A | * | 3/1998 | Birx et al. | 372/38.04 |
| 6,473,291 B1 | | 10/2002 | Stevenson | |
| 7,317,454 B2 | * | 1/2008 | Choi | 345/211 |

* cited by examiner

*Primary Examiner* — Matthew Nguyen

(57) ABSTRACT

A method and an electrical circuit for DC-DC voltage conversion in a network comprising an input voltage terminal, an output voltage terminal, at least one first switch and at least one second switch, at least one input impedance, at least one load impedance and at least one transmission line with known impedance where the electrical circuit is characterized by that the impedance of the at least one transmission line is adapted to be mismatched to at least the load impedance and where at least one of the at least first switches is arranged in relation to the at least one transmission line to switch between open and closed positions for generating a pulse wave propagating in the at least one transmission line charging a load capacitance of the load impedance with electrical energy.

18 Claims, 3 Drawing Sheets

MICROWAVE TRANSMISSION LINE DC/DC CONVERTER

TECHNICAL FIELD

The present invention is related to a method and apparatus used in the field of DC-DC converters.

BACKGROUND OF THE INVENTION

At present different solutions exist in order to step-up or step-down a DC voltage to another DC voltage.

In most DC-DC converters according to known technology, the conversion of DC voltages is achieved by using a power inductor and a capacitor.

One known example of such a DC-DC converter is given in FIG. 1.

A similar principle of use for the inductor as an energy storage device is disclosed in the U.S. Pat. No. 5,729,562, where a high voltage pulse power generating circuit is realized by means of a voltage storing element coupled to an energy recovery circuit which reverses the polarity of the energy dissipated by the pulse generation circuit and delivers this energy back to the power source. However, the circuit disclosed in U.S. Pat. No. 5,579,562 is not a DC-DC converter.

The main disadvantage of using discrete inductors as energy storage devices is the difficulty in providing them in high frequency microwave circuits. One other disadvantage of using lumped components for energy storage is their inability to be used in DC-DC converters integrated on a chip. Moreover, discrete power inductors are often the most bulky and expensive component in DC-DC converters.

One other example of a DC-DC converter is illustrated in the article by S. Djukic, et al. "A Planar 4.5-GHz DC-DC Power Converter", IEEE Transactions on Microwave Theory and Techniques, Vol. 47, No. 8, August 1999, where it is attempted to realize a power converter operating at microwave frequencies by using a class-E amplifier and Schottky diodes as rectifiers. The class-E amplifier consists of a transistor used as a switch and microstrip transmission lines acting as output capacitances and inductances. Even though the paper states that discrete components for DC-DC power conversion were not used, inductors as energy storages devices are nevertheless used for the gate and drain voltages of the power amplifier.

U.S. Pat. No. 6,946,868 attempts at using the transmission line with a switch operated to switch the input voltage through a transmission line in order to deliver an output voltage to a load without ringing in the output voltage. This is achieved by stepping up the input voltage several times and by performing the switching from one voltage level to the next at the time a reflected voltage wave arrives at the input of the transmission line.

While in this case the output voltage to the load more closely follows the input voltage sent through the transmission line avoiding ringing in the output voltage, a DC up- or down-conversion of the input voltage is neither achieved nor is the goal of the circuit disclosed.

One other solution for using a transmission line as an energy storage facility disclosed in the Dutch patent application NL7311616, where a high voltage pulse generator and two transmission lines in spiral form are used to store high voltage charges and where reflections of the voltage waves from the open ends of both transmission lines lead to a higher output voltage than the input voltage. This high output voltage is used to charge a load in the form of an X-ray tube.

The object of the invention is therefore to obviate at least some of the disadvantages with known technology.

SUMMARY OF THE INVENTION

This object is achieved by means of an electrical circuit for DC-DC voltage conversion in a network comprising an input voltage terminal, an output voltage terminal, at least one first switch and at least one second switch, at least one input impedance, at least one load impedance and at least one transmission line with known impedance which is characterized by that the impedance of the at least one transmission line is adapted to be mismatched to at least the load impedance and where at least one of the at least first switches is arranged in relation to the at least one transmission line to switch between open and closed positions for generating a pulse wave propagating in the at least one transmission line charging a load capacitance of the load impedance with electrical energy. Due to the mismatch of the transmission line impedance and the load impedance the transmission line is used both for distribution of energy to the load impedance and storage of energy.

Naturally, the at least one first and second switches in the electric circuit according to the present invention may comprise transistors or other circuit element may comprise a transistor switch and the at least one second switch may comprise a rectifier diode. This will alter the circuit efficiency somewhat, but nevertheless the function of a DC/DC-converter will be maintained.

Also, according to a variant of the electric circuit of the present invention, the load impedance may at least in part comprise a capacitive part.

In another embodiment of the electric circuit according to the present invention an impedance element is connected to the input end of the at least one transmission line and the impedance element is arranged to be mismatched to the impedance of the at least one transmission line. The advantage of the mismatched impedance element at the input end of the at least one transmission line is the ability to reflect the pulse wave reflected from the load impedance back into the transmission line. Such an impedance element may behave as a source of low impedance at high voltage and current frequencies, such as, for example, a capacitor or other suitable circuit elements with low impedance at high frequencies.

In one other embodiment of the electric circuit according to the present invention at least one first switch is arranged before the input end of the at least one transmission line and at least one second switch is arranged after the output end of the at least one transmission line. By using such a switch configuration the input voltage may be converted to a lower voltage. This may be achieved by different circuit arrangements. For example, by connecting the first switch, the transmission line, and the second switch in series, the input voltage is converted to a voltage between 0 and the input voltage. One other possible way of down-converting the input voltage to a value between 0 and the input voltage is connecting the at least one first switch to the at least one transmission line and at least one other transmission line and connecting the at least one second switch to the output end of the second transmission line.

Alternatively, the at least one first switch and the at least one second switch may be connected to the input end of the at least one first transmission line whereby the transmission line is located between the at least one first switch and the at least one second switch. If the output-end of the transmission line is short-circuited, this circuit configuration will also convert the input voltage to a lower value in a similar way as the circuit in the previous example, but it will have the additional advantage that the sign of the input voltage will be inverted.

Otherwise, if the output-end of the transmission line is open-circuited the electrical circuit will basically perform the same function as the circuit where the switches and the transmission line were connected in series.

In yet another embodiment of the electrical circuit according to the present invention the at least one first switch is connected to the output end of the at least one transmission line and the at least one second switch. This configuration has the advantage that the input voltage is up-converted into a higher output voltage.

It may also be added that the electrical circuit according to the present invention is selected among one of microstrip line, stripline, PCB (Printed Circuit Board) track, cable, delay line, and other suitable parts.

According to another aspect of the present invention the object of the invention is solved by a method for DC-DC voltage conversion in an electric circuit where the circuit comprises an input terminal, at least one first and at least one second switch, a load and an output terminal and where the method comprises the steps of:

a. providing a DC input voltage on the input terminal;
b. providing at least one transmission line with a known characteristic impedance in the electric circuit;
c. providing an impedance mismatch between the load impedance and the characteristic impedance of the transmission line;
d. providing an input impedance with a mismatching impedance in relation to the characteristic impedance of the at least one transmission line;
e. producing a first voltage and current wave propagating through the at least one transmission line by turning on and off the at least one first switch;
f. delivering power to the load through the second switch and;
g. producing a second voltage and current wave by turning on and off the first switch again when the first voltage and current waves have been reflected from the input impedance and have reached the at least one first switch.

If, for example, a transistor is used as the second switch, then the power to the load is delivered by turning on the at least one second switch. If, on the other hand, a rectifier diode were used as the second switch, the switching would be performed automatically if the amplitude of the current is above the threshold current of the rectifier diode.

In one embodiment of the method according to the present invention the at least one first switch is not turned off until the entire energy from a first voltage and current wave has been delivered to the load.

It may also be added that the method according to the present invention is particularly suited to be implemented by the electric circuit mentioned earlier in the summary.

BRIEF DESCRIPTION OF THE DRAWINGS (OPTIONAL)

DETAILED DESCRIPTION OF PREFERRED EMBODIMENTS

Figure 1:
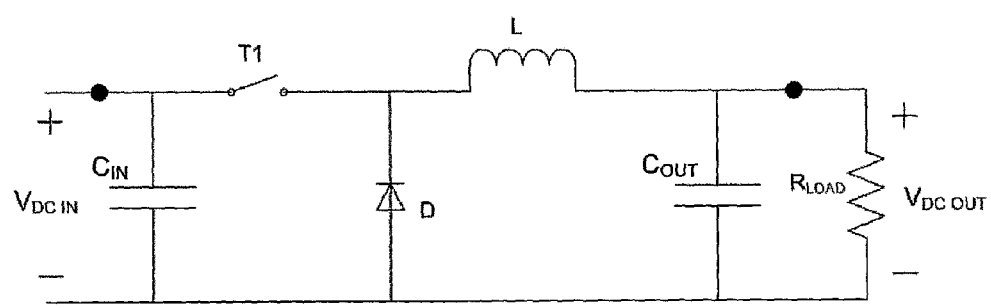
FIG. 1 illustrates a DC-DC voltage converter according to prior art.

FIG. 1 illustrates a conventional non isolated DC-DC converter using a power inductor for energy storage and a capacitor for conversion of DC voltages. The input voltage $V_{DC\ IN}$ is downconverted to the output voltage $V_{DC\ OUT}$.

The operation principle of the circuit in FIG. 1 may be described as follows. Before the switch T1 is closed the voltage over the capacitor $C_{IN}$ is $V_{DC\ IN}$. After the switch T1 is closed the capacitor $C_{OUT}$ discharges and a current flows through the circuit charging the inductor L and capacitor $C_{OUT}$. After the switch T1 is opened again, the inductor L will discharge its energy stored during the phase when the switch T1 was closed to the capacitor $C_{OUT}$ and eventually to the load $R_{LOAD}$. The voltage across the load $V_{DC\ OUT}$ will then be lower than the input voltage $V_{DC\ IN}$.

Figure 2:
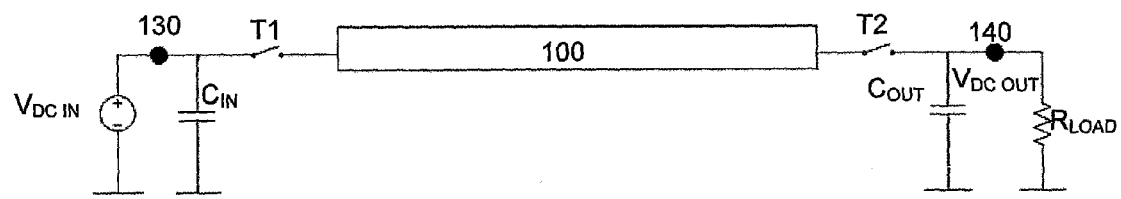
FIG. 2 illustrates a transmission line DC-DC voltage converter according to a first embodiment of the present invention.

Turning now to FIG. 2 a step-down circuit according to a first embodiment of the present invention is shown.

In the figure the input voltage $V_{DC\ IN}$ is stepped down to voltage $V_{DC\ OUT}$. The operating principle of the circuit in FIG. 2 will be explained later.

In this embodiment, T1 and T2 are transistor switches and the transmission line 100 is used as an energy storage medium. Capacitor $C_{IN}$ is used as a low impedance source for the transmission line 100 and capacitor $C_{OUT}$ holds the output voltage when no energy is supplied from the transmission line. $R_{LOAD}$ is the resistive part of the load impedance representing a consumer of the output voltage.

Figure 4:
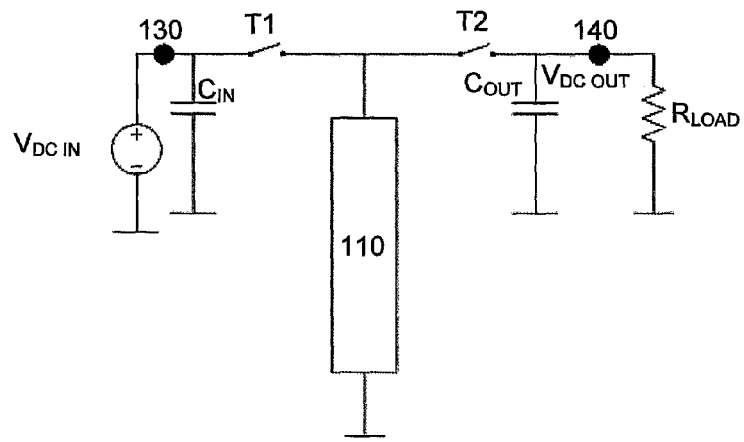
FIG. 4 shows a view of a transmission line DC-DC voltage converter according to a second embodiment of the present invention.
Figure 5:
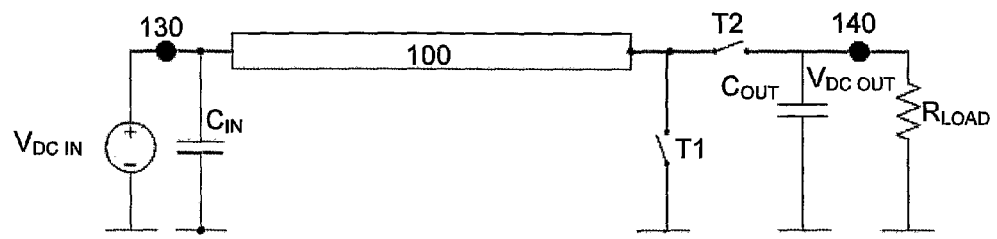
FIG. 5 illustrates a transmission line DC-DC voltage converter according to a third embodiment of the present invention.

Also, the dots with the reference numbers, 130 and 140 respectively, represent the input and output voltage terminals for the electric circuit in FIG. 2. This nomenclature for the input and output voltage terminals will be maintained throughout the description of other possible embodiments of the invention as illustrated in FIGS. 4 and 5.

The input voltage $V_{DC\ IN}$ at the input voltage terminal 130 may be supplied by a DC voltage source, such as illustrated in FIG. 2 or simply be present at the input voltage terminal 130.

Figure 3:
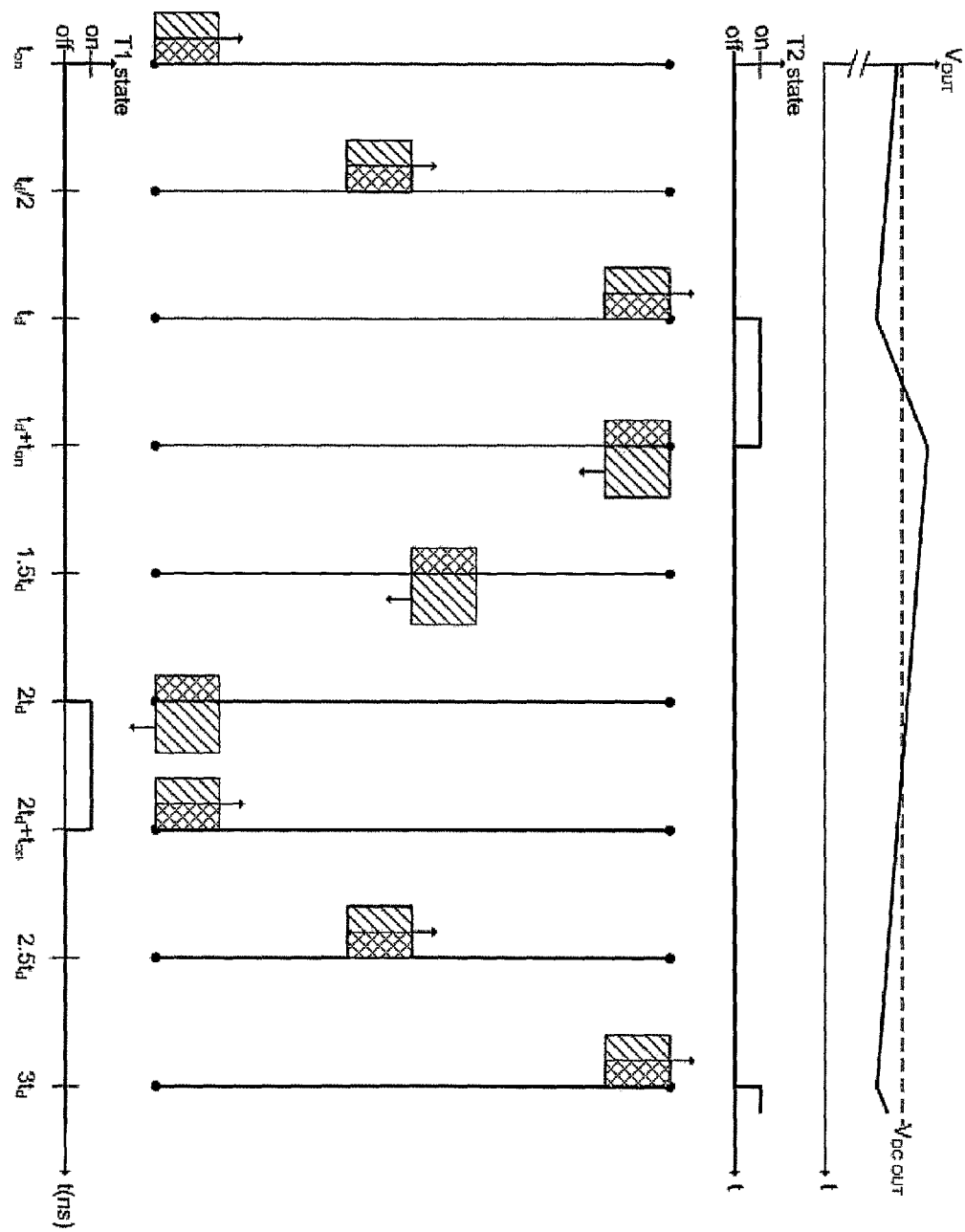
FIG. 3 illustrates a space-time diagram for the voltage and current waves in the transmission line DC-DC voltage converter according to the embodiment in FIG. 2.

Now, using the time diagram of FIG. 3 the operating principle of the step-down circuit in FIG. 2. will be described.

The filled box represents the amplitude of the voltage and the current wave and the arrow the direction of travel for the voltage and current waves, while the line on which the current wave is shown represents the zero voltage and current level. The hatched part of the box stands for the voltage wave, while the crosshatching of the other part of the box stands for the current wave. It should be pointed out that the height of the hatched box is twice as high as the height of the box with crosshatching, thus while the current may for example be 1 A, the voltage is for example 2V.

The time axes for the transistors T1 (below the time diagram) and T2 (above the time diagram) describe the switching state of each transistor.

Above the time axis for T2, a voltage versus time graph is shown illustrating the output voltage $V_{OUT}$ as a function of time. However, the voltage $V_{OUT}$ is shown when the circuit in FIG. 2 has reached a steady state. The dashed line in the voltage-time graph represents a constant mean value $V_{DC\ OUT}$ of the output voltage.

Using the two time axes for the transistors T1 and T2 the change in the output voltage $V_{OUT}$ may be readily observed.

In the following a method of switching the two transistors according to the present invention will be explained in detail using the time diagram in FIG. 3. Here, the startup and steady state phase for the voltage and current in the circuit will be explained.

At time t=0, the first transistor T1 is briefly turned on and off producing a voltage wave and an associated current wave of duration $t_{on}$ which propagate through the transmission line 100 towards the load $R_{LOAD}$. The second transistor T2 is still turned off.

At time instant $t=t_d/2$, where $t_d$ is the signal propagation time delay for one transmission line path length, the voltage and current waves have reached halfway into the transmission line, while T2 is still turned off. Here, the transmission line is acting as energy storage for the power sent into it by the transistor T1.

Next, at the time instant $t=t_d$, the voltage and current wave will have arrived at the transistor T2.

At that instant the transistor T2 is turned on for a time duration $t_{on}$ letting power be delivered to the output capacitor $C_{OUT}$ which in turn gradually discharges part of the stored energy into the load $R_{LOAD}$. This leads to an increase of the voltage across capacitor $C_{OUT}$ which is the output voltage $V_{OUT}$. It may be mentioned that the capacitance $C_{OUT}$ is part of the DC-DC-converter and that an embodiment of the invention with only an example with a resistive load $R_{LOAD}$ is shown. The load may equally be both reactive and resistive.

It may also be mentioned here that several methods may be employed to turn on the transistor T2. T2 may be either externally turned on by a driver circuit after time $t=t_d$ or it may be turned on by the current wave itself. In this case the average value of the current should be designed to be sufficient in order to turn the transistor on.

Also, the turning on of T2 may be followed by a synchronous turning off of T1. Transistor T2 may also be replaced with a diode rendering the need for a turn-on signal for the gate of transistor T2 unnecessary.

Now, due to the impedance mismatch between the characteristic impedance of the transmission line 100 and the impedance of the output capacitor $C_{OUT}$ and load resistance $R_{LOAD}$, the major part of the voltage and current waves will be reflected back into the transmission line 100.

Thereafter, at time instant $t=t_d+t_{on}$, when the reflected voltage and current waves have just passed transistor T2, T2 is turned off. In the time diagram in FIG. 3, the hatched box representing of the voltage wave is inverted, while the sign of the current wave is unchanged. This may be explained by the fact that at high frequencies, such as microwave frequencies, a capacitor acts more or less as a short circuit and thus the transmission line will be shorted at its output end. As is known to the skilled person, a voltage wave will have the opposite sign when "reflected" from a short circuited transmission line while the current wave will have an unchanged sign.

It may also be added here, that the amplitudes of the reflected voltage and current waves will be less than those of the original voltage and current waves sent into the transmission line, due to the fact that a part of the power is delivered to the output capacitor $C_{OUT}$ and load resistance $R_{LOAD}$. Also, when, T2 is turned off, the output voltage $V_{OUT}$ will start to decrease due to the discharge of the capacitor into the load resistance $R_{LOAD}$.

At time instant $t=1.5t_d$ the voltage and current wave has traveled halfway back into the transmission line towards the transistor T1. At this instant both transistors T1 and T2 are turned off and the transmission line 100 is exhibiting its energy storing function again.

Next, at the time instant $t=2t_d$ when the voltage and current waves have reached the transistor T1, T1 is turned on again, producing a second voltage wave and a second current wave propagating into the transmission line 100. T1 is also held turned on for a time duration $t_{on}$ as shown in the time graph for T1 in FIG. 3. The reflected first voltage and current waves will then pass the transistor T1 and be reflected back into the transmission line 100 due to the impedance mismatch between the characteristic impedance of the transmission line and the impedance of the capacitor $C_{IN}$. Since the input capacitor $C_{IN}$ acts as a short circuit at high frequencies in the same way as the output capacitor $C_{OUT}$ the voltage wave will be reflected from capacitor $C_{IN}$ and change its sign, while the current wave will also be reflected, but without any sign change. This is illustrated in FIG. 3 at the time instant $T=2t_d+t_{on}$ as the inverted voltage wave represented by the hatched box. The result of a first voltage wave and a first current wave traveling in the same direction to the output end of the transmission line 100 as the second voltage wave and a second current wave producing by the turning on off transistor T1 results in a superposition of the two voltage and current waves and therefore to an increase in the amplitude of both the voltage and the current wave (not shown) traveling in the transmission line.

At time instant $t=2.5\ t_d$ the new superposed voltage and current wave is illustrated as having arrived halfway through the transmission line 100. This superposed voltage and current wave will have arrived at the second transistor T2 at the time instant $t=3\ t_d$ at which instant the second transistor T2 is turned on for a time duration $t_{on}$ (not shown).

Again, one part of the superposed current wave will be dissipated into charging output capacitor $C_{OUT}$, which will lead to an increase of the output voltage $V_{OUT}$ with respect to the voltage level in the previous charging cycle of the load capacitance, while a larger part of the current wave will be reflected back into the transmission line 100. The discharge of the output capacitor $C_{OUT}$ towards the load $R_{LOAD}$ during the time the reflected voltage and current waves propagate in the transmission line will lead to a renewed decrease in the output voltage $V_{OUT}$.

During each subsequent repetition of the process of switching the transistors T1 and T2 described above, the output voltage $V_{OUT}$ will be stepped up until it has reached a steady state. This will be the case after a number of switching cycles for T1 and T2, when the current charging capacitor $C_{OUT}$ equals the discharge current supplying the load resistor $R_{LOAD}$. In this steady state the output voltage $V_{DC\ OUT}$ will vary slightly around an average DC voltage located between zero voltage and the input voltage $V_{DC\ IN}$, i.e. $0<V_{DC\ OUT}<V_{DC\ IN}$. The output DC voltage is held constant by adjusting the $t_{on}$ time when $R_{LOAD}$ is varying by using a conventional feedback loop (ordinary Pulse Width Modulation, PWM).

It may be also mentioned that the second transistor may be replaced by a rectifier diode, which will change the situation for the output voltage somewhat.

At t=0, when the first switch T1 is turned on, the output voltage across capacitor $C_{OUT}$ will be zero. Then, for each switching cycle, the output voltage $V_{OUT}$ will increase, since capacitor $C_{OUT}$ will be charged by current pulses from the transmission line until a steady-state has been reached for the output voltage $V_{DC\ OUT}$ which will have roughly the same value as in the case where T2 was a transistor switch.

Other ways of maintaining the output DC voltage constant at different loads are described below.

For example, the amount of impedance mismatch between the transmission line and the input and output capacitance may be adjusted by altering the characteristic impedance of the transmission line either by varying its width, thickness or by choosing the dielectric material the transmission line is made of. The switching frequency and the length of transmission line can also be adjusted while $t_{on}$ is held constant. Naturally, all parameters may be altered concurrently.

One other possible mode of operation for the electric circuit according to the present invention illustrated in FIG. 2 may be that the first transistor T1 is not turned on until the current pulse energy is totally delivered to the load and/or dissipated in the transmission line. During this period the T1 node should be shorted. This however, would require a third switch (not shown).

Turning now to FIG. 4, a second embodiment of the DC-DC converter according to the present invention is presented. In this particular embodiment of the present invention the source voltage $V_{DC\ IN}$ is inverted and down-converted to the output voltage $V_{DC\ OUT}$.

A DC voltage source supplying the source voltage $V_{DC\ IN}$ is connected to a first switch T1, which, for example, may be a transistor. Also, a transmission line 100 is connected to the first switch T1 and to a second switch T2. Moreover, an output capacitor $C_{OUT}$ and resistor $R_{LOAD}$ are connected to the second switch T2. The second switch may be a transistor switch or a diode, the diode version having a somewhat lesser switching efficiency. However, whether a transistor switch or a rectifier diode is used, the operation of the circuit will be analogous.

In contrast to the circuit in FIG. 2, one end of the transmission line 110 in FIG. 4 is connected with the first transistor switch T1 and the second transistor switch T2.

In this embodiment, the output end of the transmission line is short-circuited.

It may equally be possible to provide the output-end of the transmission line 110 with an open circuit, which would lead to an identical range for the output voltage $V_{OUT}$ as in the first embodiment of the present invention in FIG. 2. Thus, for the case of the transmission line 110 being connected between the transistors switches T1 and T2 in the same way as in FIG. 4 and its output end open circuited, the output voltage $V_{OUT}$ would be located in the interval $0<V_{OUT}<V_{DC\ IN}$.

The advantage of such a circuit arrangement over the one in FIG. 2 would be that the polarity of the output voltage may be changed during operation by adding a third switch T3 (not shown) at the output end of the transmission line 110. The polarity is changed by briefly switching T3 on and off.

Now, at the time instant t=0, the first transistor T1 is switched on producing a voltage and current wave which propagate in the transmission line 110 with one end connected to the first and second transistors T1 and T2. Due to the short circuit nature of the output end of the transmission line, the voltage and current waves will be reflected from the output end of the transmission line, where the voltage wave will be inverted (the sign of the voltage wave will change) and the current wave will be reflected without sign change. If the time it takes the voltage and current waves to reach the output end of the transmission line 110 is $t=t_d$, then after a time $t=2t_d$ the first transistor will be switched off and the second transistor T2 will be switched on.

As already mentioned in the earlier embodiment of the present invention, the switching of the transistors may be performed by outside driver networks for T1 and T2 which operate synchronously or the reflected voltage and current waves itself may be used to switch on the second transistor T2. Also, the second transistor may be replaced by a diode, working at a somewhat lower efficiency than the transistor.

The switching on of T2 will allow the reflected voltage and current waves to travel to the output capacitor $C_{OUT}$. Similar to the previous embodiment, the voltage and current waves will be reflected from the output capacitor, where the voltage wave will have its sign reversed again due to the short-circuit behaviour of the capacitor at high frequencies. The current wave, however, will experience no change of sign. Due to charging of the output capacitor $C_{OUT}$ the reflected voltage and current waves will have a lower amplitude than the original voltage and current waves. In contrast to the earlier described embodiment of the present invention, the output voltage $V_{DC\ OUT}$ over the output capacitor $C_{OUT}$ in this embodiment will be negative due to the negative sign the voltage wave obtained when it was reflected from the short-circuited end of the transmission line 110. After a certain time $t=t_d+t_{on}$, the voltage and current waves will have passed the second transistor T2 at which time the second transistor T2 will be switched off. At that time, the negative output voltage $V_{OUT}$ across the output capacitor $C_{OUT}$ will start to decrease (in amplitude) due to the discharge of the output capacitor $C_{OUT}$ into the load resistor $R_{LOAD}$.

After a time $t=3t_d$ the reflected voltage and current waves will have arrived at the output end of the transmission line 110, where they will be reflected again, due to the short-circuit at the output end. This will lead to a sign reversal for the voltage wave, while the current wave will be reflected without any sign change.

At the time instant $t=4t_d$, the reflected voltage and current waves will have arrived at the first transistor T1 at which time the first transistor T1 will be switched on again. This will produce a second voltage and current wave propagating into the transmission line 110 and superposing with the voltage and current waves reflected from the input impedance in the form of an input capacitance $C_{IN}$ in a similar way as described in the electric circuit in FIG. 2. Thus the amplitude of the superposed voltage and current wave will be higher than those of the original voltage and current wave before reflection at the load capacitor.

The input capacitance $C_{IN}$ acts as a low impedance source for transistor T1.

It may be mentioned here that the input capacitance $C_{IN}$ belongs to the DC-DC-converter circuit. Even though it is possible to connect a DC power source to the DC DC-converter circuit a possible power source capacitor in the DC power source on its own would not be enough to present a low impedance source for the transistor T1.

The superposed voltage and current waves will re-enter the transmission line 110 and be reflected from its short-circuited end again, the voltage wave changing its sign, while the current wave will retain its sign. Again, at time $t=5t_d$ due to the short circuit nature of the output end of the transmission line 110, the superposed voltage and current waves will be reflected towards input end of the transmission line, where the superposed voltage wave will have changed its sign, while the superposed current wave will retain its sign.

When after a time $t=6t_d$ the reflected and superposed voltage and current waves have arrived at the input end of the transmission line 110, T1 is switched off and T2 is switched on. In this fashion, the reflected and superposed voltage and current waves reach the load capacitor and are again reflected towards T2 due to the impedance mismatch mentioned earlier. At the same time, the output voltage $V_{OUT}$ over the output capacitor $C_{OUT}$ will be stepped up (in amplitude), since the amplitude of the voltage and current waves will be higher than at the time instant $t=2t_d$. The same steps as described in the first phase of the switching process are repeated again. For each switching cycle of the transistors T1 and T2 the inverted output voltage $V_{DC\ OUT}$ over the load capacitor $C_{LOAD}$ is stepped up (in absolute terms) until the energy supplied to the load capacitor $C_{LOAD}$ matches the energy dissipated by it during discharge onto the load $R_{LOAD}$. Then the circuit has reached a steady state and the output voltage $V_{DC\ OUT}$ will oscillate slightly around a fixed DC value which is negative and lower in amplitude than the input voltage $V_{DC\ IN}$.

To summarize, the relationship between $V_{DC\ IN}$ and $V_{DC\ OUT}$ in the circuit illustrated in FIG. 4 may be expressed as $-V_{DC\ IN} < V_{DC\ OUT} < 0$.

As mentioned earlier, the second transistor switch T2 may be replaced by a rectifier diode with the circuit still functioning as a DC voltage converter with the same output to input voltage relationship as mentioned in the earlier paragraph. In this case, the anode of the diode should be connected to the output capacitor $C_{OUT}$, while the cathode should be connected to the output-end of the transmission line. Thus, when T1 is turned on, a voltage and current pulse with a positive sign is generated which is blocked by the diode. However, when the voltage and current pulses have been reflected at the short-circuited end of the transmission line 110 and when, therefore, the voltage pulse has obtained a negative sign, the diode will let the voltage and current pulses pass to the output capacitor $C_{OUT}$ and charge it.

FIG. 5 illustrates an electric circuit according to a third embodiment of the present invention, where, in contrast to the first embodiment in FIG. 2, both the first transistor T1 and the second transistor T2 are placed after the transmission line. The first transistor T1 is placed after the transmission line 100, instead of before as in the first and second embodiment of the present invention in FIGS. 2 and 4.

The principle of operation of the circuit in FIG. 5 may be explained as follows.

In the original state of the circuit illustrated in FIG. 5, switches T1 and T2 are turned off. Since both switches are turned off, no current and voltage waves are travelling through the circuit and the voltage along the transmission line is equal to the input voltage $V_{DC\ IN}$.

At time $t=0$, transistor T1 is briefly switched on and off resulting in a "zero voltage" wave and associated current wave travelling through the transistor T1 and towards the input end of the electric circuit. The reason for the emergence of the "zero voltage" wave is that the switching on of T1 results in a reflection of a voltage and current wave at the short-circuit after T1, where the amplitude of the voltage wave is equal to the amplitude of the voltage across the transmission line 100 while the sign of the reflected voltage wave is negative. Thus, when the reflected voltage wave propagates through the transmission line 100, the overall voltage wave will have zero amplitude After a time $t=t_d$, the zero voltage wave and current wave have arrived at the input end of the transmission line where they are reflected back towards the output end of the transmission line 100, due to the impedance mismatch between the transmission line impedance and the impedance of the input capacitor $C_{IN}$. $C_{IN}$, acting as a short circuit at high frequencies, will lead to a short-circuit reflection of the voltage and current waves, the reflection producing a change of sign in the voltage wave and leaving the sign of the current wave unchanged. Due to the now positive sign of the voltage wave reflected from the input capacitance $C_{IN}$, the superposition of the reflected voltage wave with the voltage $V_{DC\ IN}$ results in a first superposed voltage wave propagating through the transmission line having an amplitude higher than the input voltage $V_{DC\ IN}$.

Then, after a time $t=2t_d$, the reflected voltage and current waves will have arrived at the second transistor T2 which is turned on letting the voltage and current waves reach the load impedance in the form of the output capacitance $C_{OUT}$ and a load resistance $R_{LOAD}$. Due to the same reasons pointed out earlier for $C_{IN}$, the voltage wave will be reflected with its sign inverted, while the current wave will be reflected without any sing change from the load impedance back towards the transmission line 100.

Since the output capacitor $C_{OUT}$ acts as a short-circuit at high frequencies, the output voltage $V_{OUT}$ across the output capacitor $C_{OUT}$ will at first will be zero, while one part of the current wave will be going into charging the capacitor. The charging of the output capacitor will then lead to a gradual build-up of a non-zero output voltage $V_{OUT}$ across the capacitor.

When at a time instant $t=2t_d+t_{on}$ the reflected voltage and current waves have passed transistor T2, T2 is switched off, letting the capacitor discharge onto the load resistance $R_{LOAD}$. This leads to a temporary drop in the output voltage $V_{OUT}$.

After a time $t=3t_d$ the reflected voltage and current waves will reach the input side of the transmission line 100 again, be reflected again from the input capacitance $C_{IN}$, and travel towards the output end of the transmission line. The reflected voltage wave will again be superposed onto the voltage $V_{IN}$ across the transmission line leading to a second superposed voltage wave with an even higher amplitude than the first superposed voltage wave.

At a time instant $T=4t_d$, T1 is switched on again, leading to a new reflection of the voltage and current waves from the now short-circuited output part of the transmission line 100 back into the transmission line 100 and producing a second voltage and current wave which is superposed on the reflected voltage and current waves. Since both the second voltage and current waves and the reflected voltage and current waves have the same sign, this amplitude of the superposed reflected voltage and current will be higher than the amplitude of the original voltage and current waves.

When after a time $t=4t_d+t_{on}$ the superposed reflected voltage and current waves have passed transistor T1, it is turned off again.

Now, after a time $t=5t_d$, the voltage and current waves will be reflected again in the input capacitance $C_{IN}$, and reflected back into the transmission line. The reflected voltage wave will again be superposed onto the existing voltage $V_{IN}$ across the transmission line leading to a third superposed voltage wave with an even higher amplitude than the second superposed voltage wave.

Thereafter, at the time $t=6t_d$ the superposed reflected voltage and current waves will have arrived at transistor T2, which is turned on letting the superposed reflected voltage and current waves reach the load impedance again.

Again, due to the impedance mismatch between the transmission line impedance and the load impedance, one part of the voltage and current waves will be reflected back into the transmission line, while the other part will be delivered to the load resistance and output capacitor $C_{OUT}$.

Due to the higher amplitude of the superposed voltage wave as compared to the original voltage wave that arrived at the load the first time, the voltage across the output capacitor $C_{OUT}$ results in a higher output voltage $V_{OUT}$.

After a time $t=6t_d+t_{on}$, when the reflected superposed voltage and current waves have passed transistor T2, T2 is switched off again and the capacitor starts discharging into the load resistor leading to a slight decrease in the output voltage.

Then the entire switching cycle starts all over again. After each switching the current delivered to the load capacitor will be higher than the previous current (due to the rising in amplitude of the current wave after each superposition of the reflected voltage and current waves with the newly produced voltage and current waves due to the turning on and off of T1). After a number of cycles the voltage over the load capacitor $V_{OUT}$ will exceed the input voltage $V_{DC\ IN}$ and reach a steady state value. This will be achieved when the current delivered to the load capacitor will be equal to the discharge current of the capacitor after the voltage and current waves have been reflected from the load impedance. Hence, in this case the relation between the input voltage $V_{DC\ IN}$ and the output voltage $V_{OUT}$ will be $V_{DC\ IN} > 0$ and $V_{OUT} > V_{DC\ IN}$.

Using pulse width modulation, i.e. altering the switching duration of the transistors T1 and T2, any value of the output voltage $V_{DC\ OUT}$ may theoretically be achieved. However, due to losses in the transistor switches, the transmission line and the discrete impedance components, there is an upper limit of achievable output voltage $V_{DC\ OUT}$.

Also, the rise of the output voltage $V_{DC\ OUT}$ for each switching cycle of the transistors T1 and T2 may be controlled by adjusting the impedance mismatch between the characteristic impedance of the transmission line 100 and the load impedance.

This may be achieved, as mentioned earlier, by changing parameters which alter the characteristic impedance of the transmission line, such as the width or the thickness of the transmission line or by using different dielectric materials for the transmission line.

It may also be mentioned, that the electric circuit according to the present invention is not necessarily limited to one transmission line. One may equally use two or more transmission lines (not shown). The DC-DC voltage conversion function will still be retained.

The electric circuit according to the present invention is not limited to one DC output voltage. Multiple DC output voltages can be obtained by using several synchronous rectifiers and output capacitors connected to one transmission line. For example switch T1 in FIG. 2 can generate double pulses with different $t_{on}$ times that will be rectified in two different synchronous rectifiers at the transmission line output end (not shown).

Finally, the function of the transmission line may be replaced by a number of discrete components, i.e. a sequence of LC-circuits (inductors and capacitors) cascaded to form an artificial transmission line. Thus, instead of using one bulky power inductor, the power storage function of the transmission line may be emulated by cascaded LC-components which will physically distribute energy storage compared to the single power inductor used in known technology. This electric circuit would have the advantage of being able to lower the switching frequency of the switches T1 and T2 and therefore improving efficiency.

It will be clear for the skilled person after having read the description above, that various modifications of the present invention are possible and that the invention is only limited by the scope of the accompanying claims.

The invention claimed is:

1. An electrical circuit for DC-DC voltage conversion in a network comprising:
    an input voltage terminal;
    at least one input impedance ($C_{IN}$) coupled in parallel to the input voltage terminal;
    at least one first switch (T1) coupled in series with the input voltage terminal;
    and at least one transmission line with known impedance coupled in series with the at least one first switch (T1);
    at least one second switch (T2) coupled in series with the at least one transmission line;
    an output voltage terminal in series with the second switch (T2);
    at least one load impedance coupled to the output voltage terminal;
    wherein the impedance of the at least one transmission line is adapted to be mismatched to at least the load impedance and where at least one of the at least first switches (T1) is arranged in relation to the at least one transmission line to switch between open and closed positions for generating a pulse wave propagating in the at least one transmission line charging the load capacitance ($C_{OUT}$) of the load impedance with electrical energy.

2. The electrical circuit according to claim 1, wherein a DC voltage source is connected to said input voltage terminal.

3. The electrical circuit according to claim 1, wherein the input impedance ($C_{IN}$) is coupled to the input end of the at least one transmission line and where the input impedance is arranged to be mismatched to the impedance of the at least one transmission line.

4. The electrical circuit according to claim 3, wherein the input impedance is a capacitor whose impedance is adapted to be mismatched to the impedance of the at least one transmission line.

5. The electrical circuit according to claim 1, wherein the at least one first switch (T1) is arranged before the input end of the at least one transmission line and where the at least one second switch (T2) is arranged after the output end of the at least one transmission line.

6. The electrical circuit according to claim 5, wherein the at least one first switch (T1), the at least one transmission line and the at least one second switch (T2) are connected in series.

7. The electrical circuit according to claim 1, wherein the at least one first switch (T1) and the at least one second switch (T2) are connected to the input end of the at least one first transmission line and where the transmission line is located between the at least one first switch (T1) and the at least one second switch (T2).

8. The electrical circuit according to claim 7, wherein the at least one transmission line is open-circuited at its output end.

9. The electrical circuit according to claim 7, wherein the at least one transmission line is short-circuited at its output end.

10. The electrical circuit according to claim 1, wherein the at least one first switch (T1) is coupled with the output end of the at least one transmission line and the at least one second switch (T2).

11. The electrical circuit according to claim 1, wherein the at least one first and second switches (T1, T2) comprise transistors or other circuit elements suitable to be used as switches.

12. The electrical circuit according to claim 1, wherein the at least one first switch (T1) comprises a transistor switch and the at least one second switch (T2) comprises a rectifier diode.

13. The electrical circuit according to claim 1, wherein the load impedance ($C_{OUT}$) at least in part comprises a capacitive part.

14. The electrical circuit according to claim 1, wherein the at least one transmission line is selected from the group consisting of a microstrip line, stripline, printed circuit board track, cable, and delay line.

15. A method for DC-DC voltage conversion in an electric circuit, the circuit comprising an input terminal, at least one first and at least one second switch, a load and an output terminal comprising the steps of:
- providing a DC input voltage on the input terminal;
- providing at least one transmission line with a known characteristic impedance in the electric circuit;
- providing an impedance mismatch between the load impedance and the characteristic impedance of the transmission line;
- providing an input impedance with a mismatching impedance in relation to the characteristic impedance of the at least one transmission line;
- producing a first voltage and current wave propagating through the at least one transmission line by turning on and off the at least one first switch;
- delivering power to the load through the second switch; and
- producing a second voltage and current wave by turning on and off said first switch again when the first voltage and current waves have been reflected from the input impedance and have reached the at least one first switch.

16. The method according to claim 15, wherein said power to the load is delivered by turning on the at least one second switch.

17. The method according to claim 15, wherein the at least one first switch is not turned off until the entire energy from a first voltage and current wave has been delivered to the load.

18. The method according to claim 15, wherein the at least one first switch is not turned on again until both the first and the second part of the first voltage and current waves have delivered power to the load.

* * * * *

UNITED STATES PATENT AND TRADEMARK OFFICE
CERTIFICATE OF CORRECTION

PATENT NO.        : 8,174,247 B2
APPLICATION NO.   : 12/446715
DATED             : May 8, 2012
INVENTOR(S)       : Sander It is certified that error appears in the above-identified patent and that said Letters Patent is hereby corrected as shown below:

In Column 3, Line 58, after "DRAWINGS" delete "(OPTIONAL)".

In Column 4, Line 48, delete "FIG. 2." and insert -- FIG. 2 --, therefor.

In Column 10, Line 11, delete "sing" and insert -- sign --, therefor.

Signed and Sealed this
Ninth Day of October, 2012

David J. Kappos
*Director of the United States Patent and Trademark Office*